United States Patent
Kadobayashi

(10) Patent No.: US 8,842,299 B2
(45) Date of Patent: Sep. 23, 2014

(54) IMAGE FORMING APPARATUS HAVING A PRINTING FUNCTION AND A SCANNER FUNCTION

(71) Applicant: KYOCERA Document Solutions Inc., Osaka (JP)

(72) Inventor: Izumi Kadobayashi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/753,758

(22) Filed: Jan. 30, 2013

(65) Prior Publication Data
US 2013/0194596 A1    Aug. 1, 2013

(30) Foreign Application Priority Data
Jan. 31, 2012    (JP) .................................. 2012-017956

(51) Int. Cl.
*H04N 1/00* (2006.01)
*G03G 15/00* (2006.01)

(52) U.S. Cl.
CPC ....... *H04N 1/00278* (2013.01); *G03G 15/6552*
(2013.01)
USPC ....... 358/1.12; 358/1.13; 358/1.14; 358/1.15;
270/58.02; 271/220; 399/80

(58) Field of Classification Search
CPC ......... B65H 31/22; B65H 39/10; G03G 21/02
USPC .............. 358/1.12–1.15; 271/220; 270/58.02;
399/80
See application file for complete search history.

(56) References Cited

U.S. PATENT DOCUMENTS

| 6,279,892 | B1 | 8/2001 | Yoshida et al. |
| 2008/0159769 | A1 | 7/2008 | Sato et al. |
| 2009/0309296 | A1 | 12/2009 | Taki et al. |

FOREIGN PATENT DOCUMENTS

| JP | H09-006557 A | 1/1997 |
| JP | H11-147647 A | 6/1999 |

OTHER PUBLICATIONS

Extended European Search Report for European Application No. 13153035.4 dated Jul. 26, 2013.

*Primary Examiner* — Qian Yang
(74) *Attorney, Agent, or Firm* — Pearl Cohen Zedek Latzer Baratz LLP

(57) ABSTRACT

An image forming apparatus has a printing function, a scanner function, and a control unit. In the printing function, a printed material acquired by recording image data included in a printing job received through a network on a recording paper is discharged. In the scanner function, the image data is acquired by reading a manuscript. The control unit judges whether the scanner function is in use for a long time (step A2) at the time of receiving the printing job (step A1). A printed material is discharged to an in-body discharge tray when it is judged that the scanner function is not in use for a long time (step A3). The printed material is discharged to a side discharge tray when it is judged that the scanner function is in use for a long time (step A5).

3 Claims, 5 Drawing Sheets

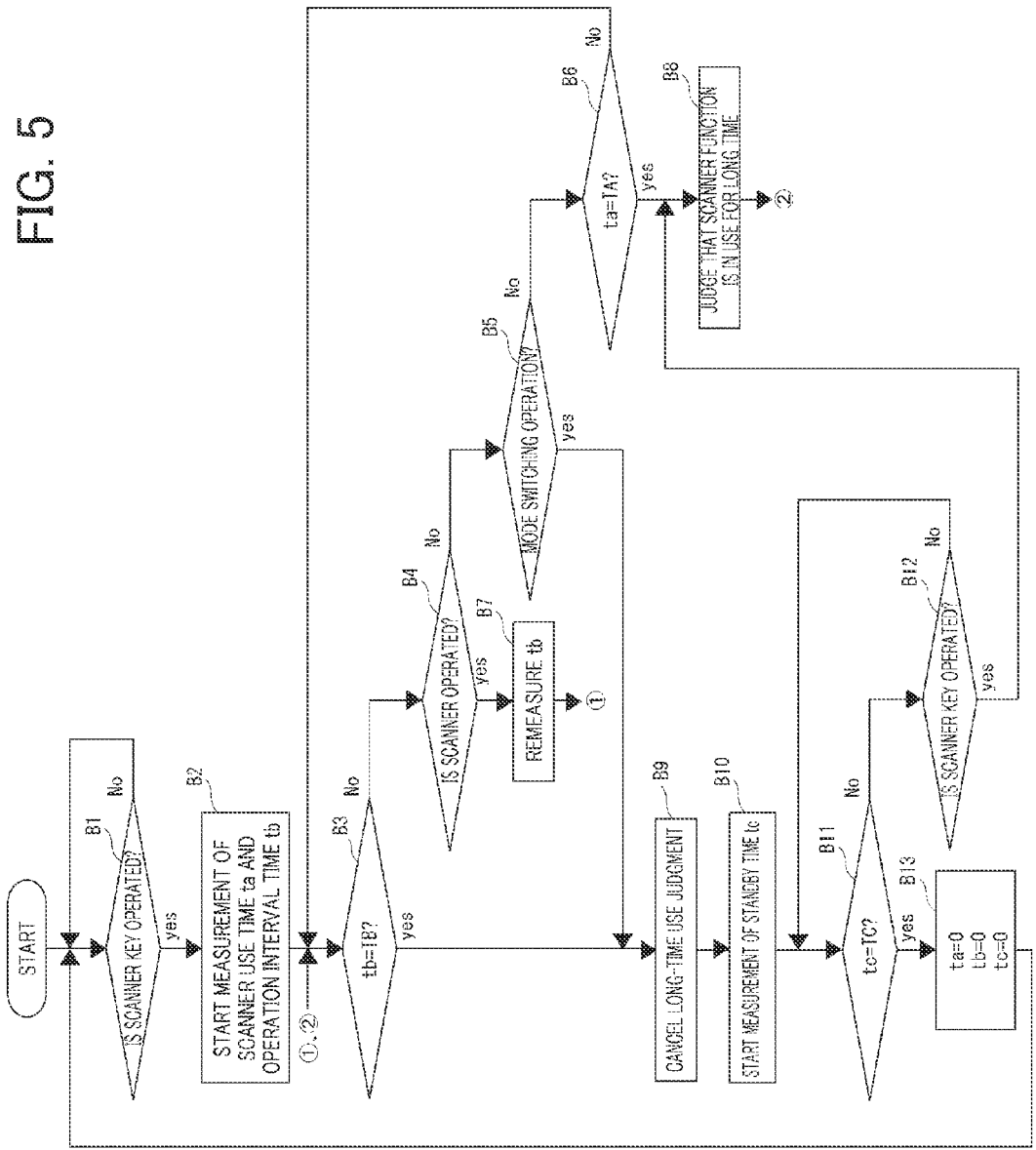

IMAGE FORMING APPARATUS HAVING A PRINTING FUNCTION AND A SCANNER FUNCTION

INCORPORATION BY REFERENCE

This application is based upon and claims the benefit of priority from the corresponding Japanese Patent Application No. 2012-017956, filed in the Japan Patent Office on Jan. 31, 2012, the entire contents of which are incorporated herein by reference.

BACKGROUND

The present disclosure relates to an image forming apparatus, and more particularly, to an image forming apparatus having a printing function to record image data included in a printing job received via a network on a recording paper and a scanner function to acquire the image data by reading a manuscript image.

In recent years, a lot of image forming apparatuses such as a copy machine and a multifunction peripheral have been connected to peripheral apparatuses such as a personal computer by a network such as a LAN. In this case, the image forming apparatus is used as a printing terminal that record image data included in a printing job received from the peripheral apparatuses via the network on the recording paper. There are a lot of cases in which installation places of the image forming apparatus cannot be verified with naked eyes from an operating place of a PC when printing is performed based on the printing job received via the network. Even when the image forming apparatus has a plurality of discharge trays, it is difficult to designate an empty discharge tray at a PC side. Therefore, when printing is performed based on the printing job received via the network, it is proposed that the empty discharge tray is selected and discharged in the image forming apparatus.

However, there is a case in which an in-body discharge tray is clogged and it is difficult to eject the discharged recording paper if a scanner function is in use when a recording paper is discharged to the empty in-body discharge tray in an image forming apparatus having the scanner function to read a manuscript image and the in-body discharge tray.

SUMMARY

An image forming apparatus of the present disclosure has a printing function and a scanner function, and includes a first discharge tray, a second discharge tray, a long-time use judging unit, and a discharge destination selecting unit. In the printing function, a printed material acquired by recording image data included in a printing job received through a network on a recording paper is discharged. In the scanner function, the image data is acquired by reading a manuscript image. The first discharge tray is provided in a discharge space in a body of the apparatus. The second discharge tray is a discharge tray other than the first discharge tray. The long-time use judging unit judges whether the scanner function is in use for a long time. The discharge destination selecting unit discharges the printed material to the first discharge tray when the long-time use judging unit judges that the scanner function is not in use for a long time at the time of receiving the printing job and discharges the printed material to the second discharge tray when the long-time use judging unit judges that the scanner function is in use for a long time at the time of receiving the printing job.

BRIEF DESCRIPTION OF DRAWINGS

FIG. 5 is a flowchart for describing a long-time use judging operation of a scanner function of the image forming apparatus according to the embodiment of the present disclosure.

DETAILED DESCRIPTION

An embodiment of the present disclosure will be described in detail with reference to the accompanying drawings.

Figure 1:
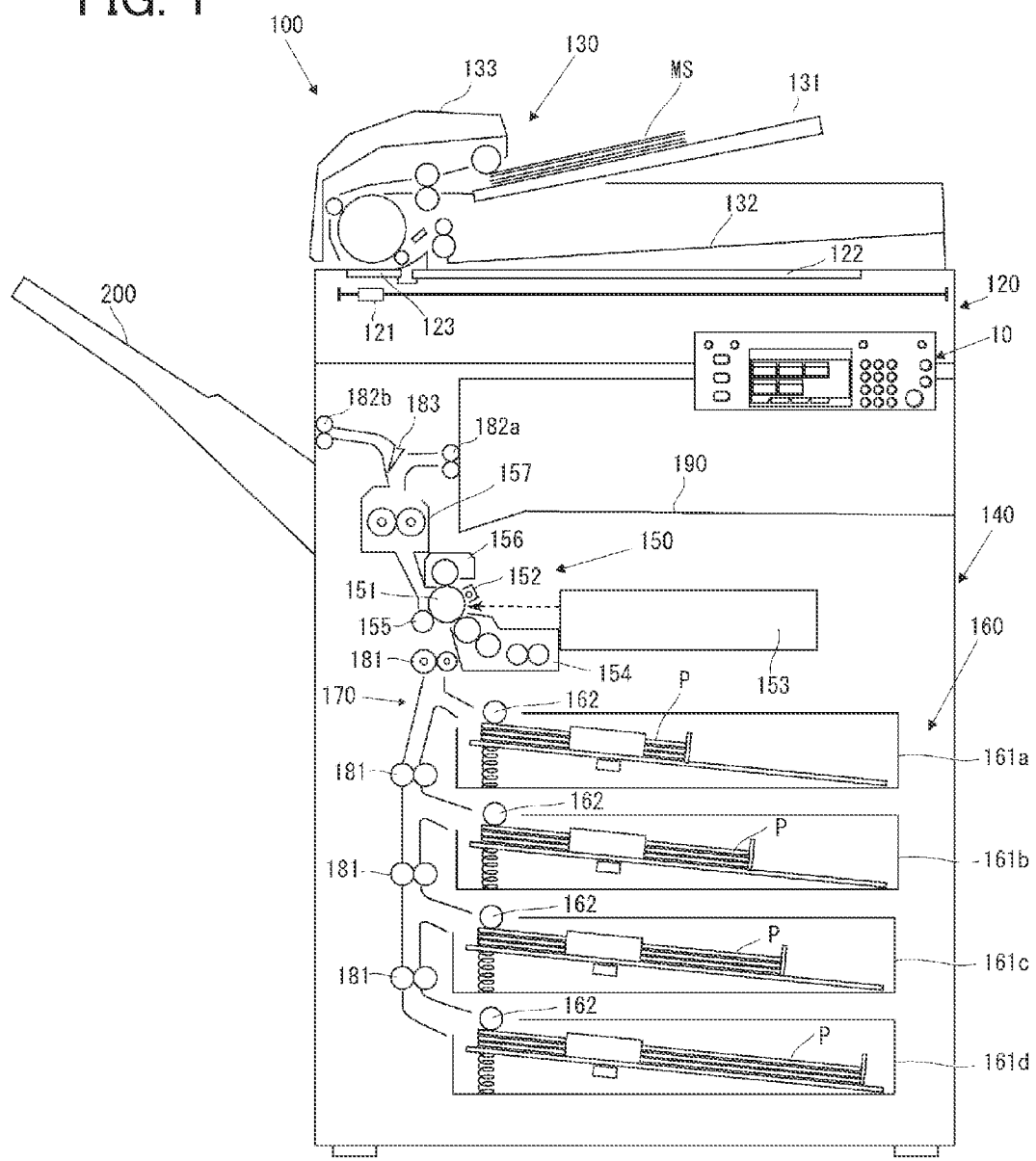
FIG. 1 is a schematic longitudinal cross-sectional view illustrating an image forming apparatus according to an embodiment of the present disclosure.

An image forming apparatus 100 according to the embodiment of the present disclosure is a multifunction peripheral having a copying function, a printing function, a scanner function, and the like. As illustrated in FIG. 1, the image forming apparatus 100 includes a manuscript reading unit 120, a manuscript feeding unit 130, and a recording unit 140. The manuscript reading unit 120 is provided above the recording unit 140. The manuscript feeding unit 130 is provided above the manuscript reading unit 120. An operating panel 10 that performs setting or an operating command of the image forming apparatus 100 is provided on a front surface side of the image forming apparatus 100.

Figure 2:
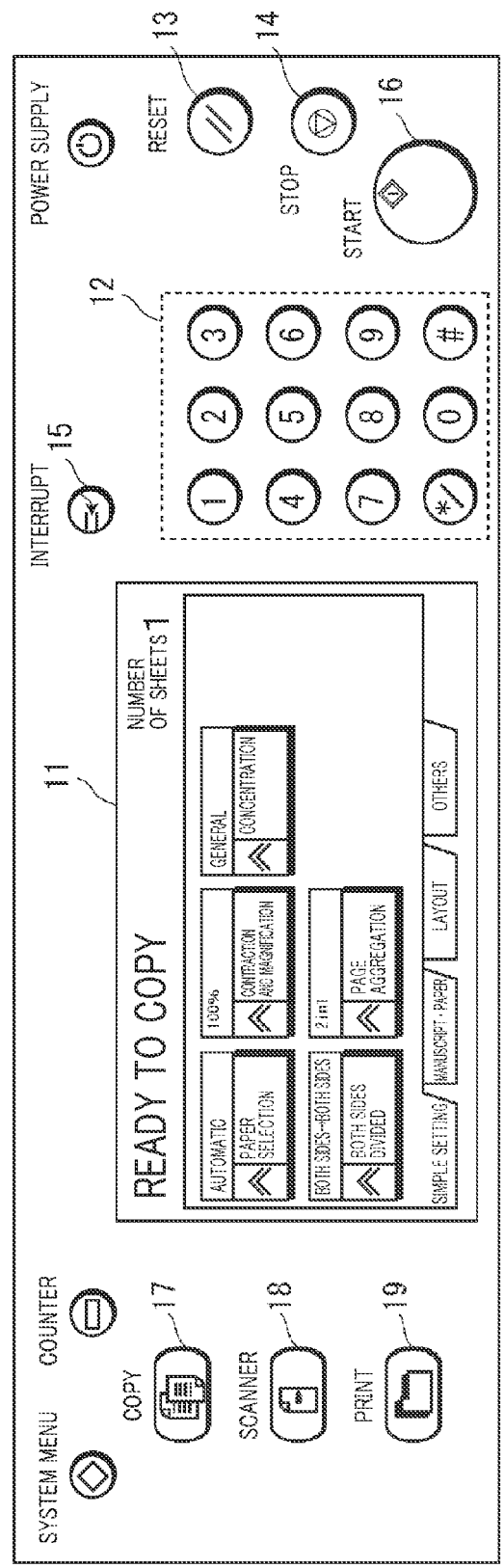
FIG. 2 is a front view illustrating an operating panel illustrated in FIG. 1.

The operating panel 10 includes a touch panel 11 in which a transparent pressure sensor is provided on the surface of a liquid crystal display panel, and various operating keys, as illustrated in FIG. 2. The operating keys include a numerical keypad 12, a reset key 13, a stop key 14, an interrupt key 15, and a start key 16. The numerical keypad 12 is used to input numerical values such as the number of printing sheets. The reset key 13 is used to input a command to initialize setting information. The stop key 14 is used to stop a copying operation and erase the input numerical values. The interrupt key 15 is used to command an interrupt copy. The start key 16 is used to input an output command to start the printing operation.

The operating panel 10 also includes a mode switching key. The mode switching key includes a copying key 17 for commanding the copying function, a scanner key 18 for commanding the scanner function, and a printing key 19 for commanding the printing function. Operating screens corresponding to the function modes commanded by the mode switching keys are displayed on the touch panel 11. In the mode of the copying function, image data of a manuscript MS read by the manuscript reading unit 120 is recorded on a recording paper P by the recording unit 140. In the mode of the scanner function, the image data of the manuscript MS read by the manuscript reading unit 120 is stored in a storage unit or transmitted (facsimile transmission, and the like) via a network. In the mode of the printing function, the image data stored in the storage unit is recorded on the recording paper P by the recording unit 140.

As illustrated in FIG. 1, the manuscript reading unit 120 includes a scanner 121, a platen glass 122, and a manuscript reading slit 123. The scanner 121 is constituted by an exposure lamp and a charge coupled device (CCD) sensor, and the like to be movable in a conveyance direction of the manuscript MS by the manuscript feeding unit 130. The platen glass 122 is a manuscript stand formed by a transparent member such as glass. The manuscript reading slit 123 has a slit that extends in a direction perpendicular to the conveyance direction of the manuscript MS by the manuscript feeding unit 130.

The scanner 121 is moved to a position opposite to the platen glass 122 at the time of reading the manuscript MS placed on the platen glass 122. The scanner 121 reads the manuscript MS by scanning the manuscript MS placed on the platen glass 122 to acquire the image data. The scanner 121 is moved to a position opposite to the manuscript reading slit 123 at the time of reading the manuscript MS conveyed by the manuscript feeding unit 130. The scanner 121 reads the manuscript MS in synchronization with a conveying operation of the manuscript MS by the manuscript feeding unit 130 through the manuscript reading slit 123 to acquire the image data.

The manuscript feeding unit 130 includes a manuscript placing unit 131, a manuscript discharging unit 132, and a manuscript conveying mechanism 133. The manuscript conveying mechanism 133 ejects the manuscript MS placed in the manuscript placing unit 131 sequentially sheet by sheet. The manuscript MS ejected by the manuscript conveying mechanism 133 is conveyed to a position opposite to the manuscript reading slit 123 of the manuscript reading unit 120 and subsequently, discharged to the manuscript discharging unit 132. A front part of the manuscript feeding unit 130 may be lifted upward. The top surface of the platen glass 122 may be opened by lifting up the front part of the manuscript feeding unit 130.

The recording unit 140 includes an image forming unit 150. The recording unit 140 also includes a paper feeding unit 160, a conveyance path 170, a conveyance roller 181, a discharge roller 182a and a discharge roller 182b, an in-body discharge tray 190 installed in a discharge space in the body of the image forming apparatus 100, and a side discharge tray 200 provided on the side of the image forming apparatus 100.

The paper feeding unit 160 includes a plurality of paper feeding cassettes 161a to 161d and a paper feeding roller 162. The recording paper P is received in the plurality of paper feeding cassettes 161a to 161d. The paper feeding roller 162 ejects the recording paper P from the paper feeding cassettes 161a to 161d to the conveyance path 170 sheet by sheet. The paper feeding roller 162, the conveyance roller 181, and the discharge rollers 182a and 182b serve as conveyance units and the recording paper P is conveyed by the conveyance units. The recording paper P ejected to the conveyance path 170 by the paper feeding roller 162 is conveyed to the image forming unit 150 by the conveyance roller 181. The recording paper P on which the image data is recorded by the image forming unit 150 is output to the outside of the apparatus by the discharge roller 182a or the discharge roller 182b. The discharge roller 182a and the discharge roller 182b are switched by a switching claw 183 that operates according to the operation of the operating panel 10. When the recording paper P on which the image data is recorded is guided to the discharge roller 182a by the switching claw 183, the recording paper P is output to the in-body discharge tray 190 as a printed material. Further, when the recording paper P on which the image data is recorded is guided to the discharge roller 182b by the switching claw 183, the recording paper P is discharged to the side discharge tray 200 as the printed material. In the embodiment, four paper feeding cassettes 161a to 161d are provided.

The image forming unit 150 includes a photoreceptor drum 151, a charging unit 152, an exposure unit 153, a development unit 154, a transfer unit 155, a cleaning unit 156, and a fixation unit 157. The exposure unit 153 is an optical unit including a laser device, and a mirror. The exposure unit 153 outputs laser light based on the image data to expose the surface of the photoreceptor drum 151. The surface of the photoreceptor drum 151 is charged by the charging unit 152 before exposure. As a result, an electrostatic latent image is formed on the exposed surface of the photoreceptor drum 151. The development unit 154 is a development unit that develops the electrostatic latent image formed on the surface of the photoreceptor drum 151 by using a toner. A toner image based on the electrostatic latent image is formed on the photoreceptor drum 151 by the development unit 154. The transfer unit 155 transfers the toner image formed on the photoreceptor drum 151 by the development unit 154 on the recording paper P. The fixation unit 157 heats the recording paper P on which the toner image is transferred by the transfer unit 155 to fix the toner image on the recording paper P.

Figure 3:
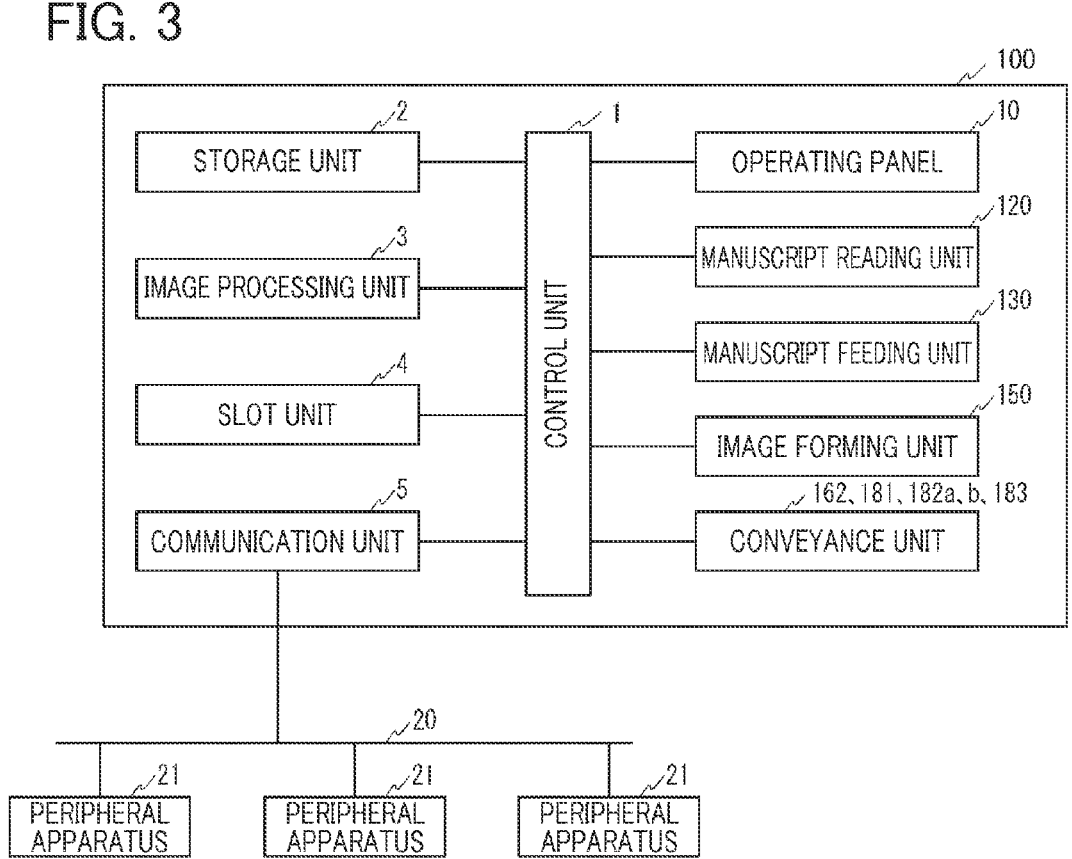
FIG. 3 is a block diagram illustrating a control system of the image forming apparatus according to the embodiment of the present disclosure.

Subsequently, a control system of the image forming apparatus 100 will be described with reference to FIG. 3.

In the image forming apparatus 100, the operating panel 10, the manuscript reading unit 120, the manuscript feeding unit 130, the image forming unit 150, and the conveyance unit (the paper feeding roller 162, the conveyance roller 181, the discharge rollers 182a and 182b, and the switching claw 183) are connected to a control unit 1 and the operations thereof are controlled by the control unit 1. A storage unit 2, an image processing unit 3, a slot unit 4, and a communication unit 5 are also connected to the control unit 1.

The control unit 1 is an information processing unit such as a microcomputer including a read only memory (ROM), a random access memory (RAM). A control program for controlling the operation of the image forming apparatus 100 is stored in the ROM. The control unit 1 develops the control program to the RAM by reading the control program stored in the ROM to control the entire apparatus according to predetermined command information input from the operating panel 10.

The storage unit 2 is constituted by a semiconductor memory or a hard disk drive (HDD). The image data acquired by reading the manuscript in the manuscript reading unit 120 or image data received from peripheral apparatuses through the communication unit 5 is stored in the storage unit 2.

The image processing unit 3 performs predetermined image processing with respect to the image data. For example, magnification and contraction processing, and image enhancement processing such as concentration adjustment, gray adjustment are performed by the image processing unit 3.

The slot unit 4 is an external memory connection unit and an external memory such as a USB memory or an SD card is connected thereto.

The communication unit 5 transmits and receives various data to and from a peripheral apparatus 21 such as a PC through a network 20 such as a LAN.

Subsequently, a discharge destination selecting operation in the image forming apparatus 100 according to the embodiment will be described in detail with reference to FIG. 4.

Figure 4:
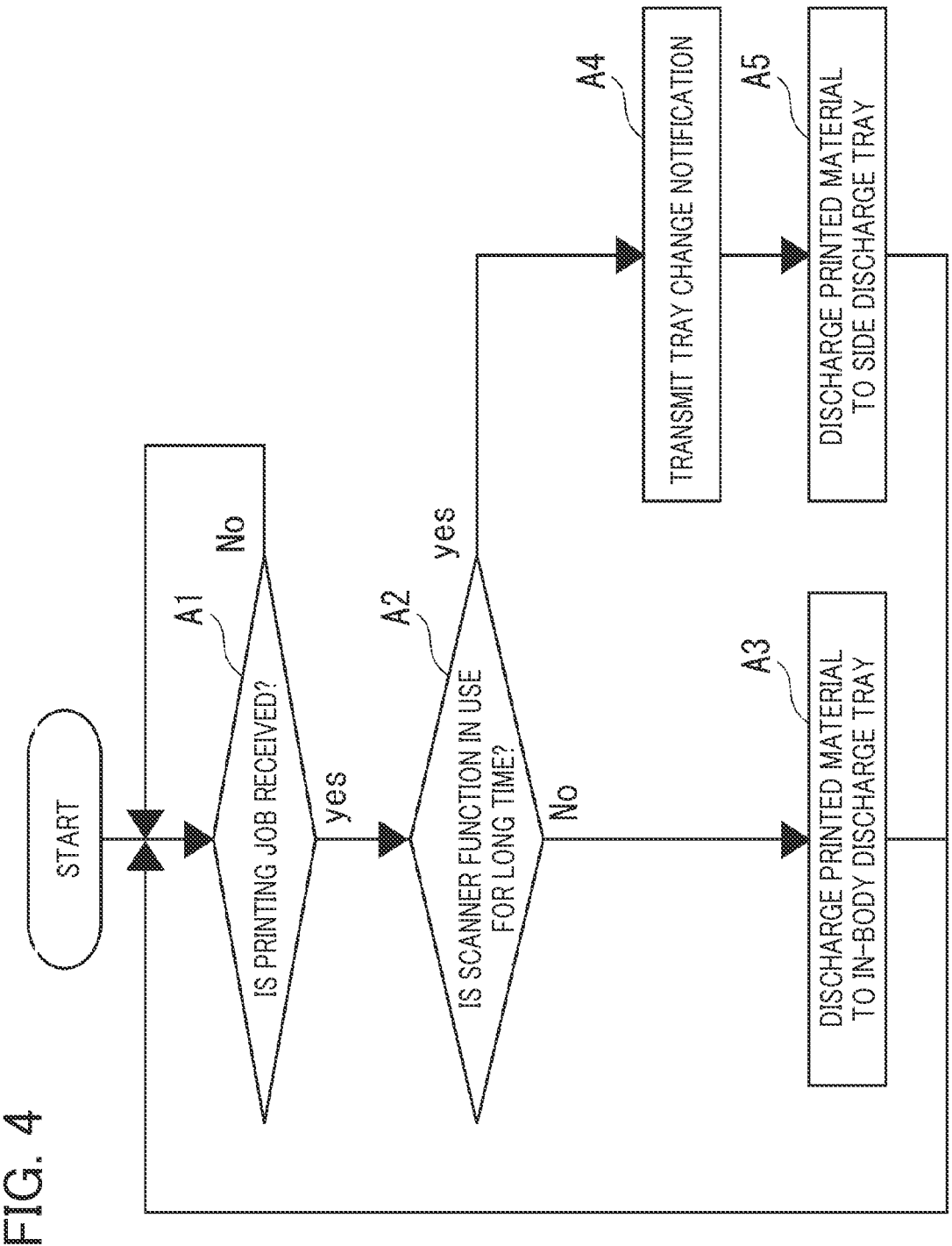
FIG. 4 is a flowchart for describing a discharge destination selecting operation of the image forming apparatus according to the embodiment of the present disclosure.

As illustrated in FIG. 4, the control unit 1 monitors reception of a printing job including printing data (step A1). When the communication unit 5 receives the printing job from the peripheral apparatus 21 through the network 20, the control unit 1 judges whether the scanner function is in use for a long time (step A2). Further, the long-time use judging operation of the scanner function for judging whether the scanner function is in use for a long time will be described below.

When the control unit 1 judges that the scanner function is not in use for a long time in step A2, the control unit 1 executes the received printing job. The control unit 1 discharges a printed material generated by executing the printing job to the in-body discharge tray 190 which is a default discharge destination (step A3). Thereafter, the control 1 returns to step A1.

When the control unit 1 judges that the scanner function is in use for a long time in step A2, the control unit 1 transmits a tray change notification from the communication unit 5 to the peripheral apparatus 21 through the network 20 (step A4). In the tray change notification, it is notified that the discharge destination of the printed material is changed to the side discharge tray 200 as another discharge destination from the in-body discharge tray 190 which is the default discharge destination. As a result, the control unit 1 discharges the printed material to the side discharge tray 200 (step A5). Thereafter, the control 1 returns to step A1.

In the embodiment, only one side discharge tray 200 as another discharge destination different from the in-body discharge tray 190 which is the default discharge destination has been described. However, a plurality of discharge destinations may be provided as another discharge destination. When the plurality of discharge destinations are provided as another discharge destination, a specific discharge destination among other discharge destinations may be, in advance, set from the peripheral apparatus 21 or any discharge destination among other discharge destinations may be set when the peripheral apparatus 21 receives the tray change notification.

Subsequently, the long-time use judging operation of the scanner function for judging whether the scanner function is in use for a long time will be described in detail with reference to FIG. 5.

The control unit 1 monitors an operation of a scanner key 18 as illustrated in FIG. 5 (step B1). When the scanner key 18 is operated and the scanner function is thus commanded (yes of step B1), the control unit 1 starts measurement of a scanner use time ta and an operation interval time tb (step B2).

During the measurement of the scanner use time ta and the operation interval time tb, the control unit 1 monitors arrival of the operation interval time tb at a reference interval time TB (step B3), a scanner operation for setting or executing the scanner function (step B4), a mode switching operation for commanding switching a mode from the scanner function to other functions (step B5), and arrival of the scanner use time to at a reference use time TA (step B6). The reference interval time TB of step B3 is a time for judging whether the scanner operation monitored in step B4 is continuously performed. When the operation interval time tb arrives at the reference interval time TB in step B3 (yes of step B3), the control unit 1 judges that the scanner operation is not continuously performed. The reference interval time TB may be set in advance or arbitrarily. In the scanner function, when there is no operation for a predetermined time, the mode may be configured to return to default operation modes (copying function, and the like). In this case, the reference interval time TB may be set to a time when the mode returns to the default operation modes (copying function, and the like). The scanner operation of step B4 includes an operation of setting (designation of resolution, and the like) for reading a manuscript image and an operation (an operation of the start key 16) for reading execution. The mode switching operation of step B5 includes an operation of, for example, the reset key 13, the stop key 14, the interrupt key 15, the copying key 17 or the printing key 19. The reference use time TA of step B6 is a time for judging whether the scanner function is in use for a long time. The reference use time TA is set to a time longer than the reference interval time TB. The reference use time TA may be set in advance or arbitrarily.

When the control unit 1 detects the scanner operation for performing the scanner function in step B4 (yes of step B4), the control unit 1 resets the operation interval time tb and thereafter, starts remeasurement (step B7). Thereafter, the control 1 returns to step B3. The detecting operation of the scanner operation for performing the scanner function in step B4 indicates that the detecting operation of the scanner operation is performed before the operation interval time tb arrives at the reference interval time TB in step B3 (no of step B3) and before the scanner use time ta arrives at the reference use time TA in step B6 (no of step B6) while the mode switching operation is not performed in step B5 (no of step B5). This indicates that the scanner operation is continuously performed.

The control unit 1 judges that the scanner function is in use for a long time (step B8) when the scanner use time ta arrives at the reference use time TA in step B6 (yes of step B6). Thereafter, the control 1 returns to step B3. The arrival of the scanner use time ta at the reference use time TA in step B6 indicates that the scanner use time ta arrives at the reference use time TA before the operation interval time tb arrives at the reference interval time TB in step B3 (no of step B3) and while the mode switching operation is not performed in step B5 (no of step B5). This indicates that the scanner operation is continuously performed throughout the reference use time TA.

When the operation interval time tb arrives at the reference interval time TB in step B3 (yes of step B3), the control unit 1 judges that the scanner operation is not continuously performed. As a result, the control unit 1 cancels the judgment of the long-time use performed in step B8 (step B9). The control unit 1 judges that the scanner function is switched to other function modes even when the mode switching operation is performed in step B5 (yes of step B5). As a result, the control unit 1 cancels the judgment of the long-time use performed in step B8 (step B9).

Subsequently, the control unit 1 starts measurement of a standby time tc (step B10). During the measurement of the standby time tc, the control unit 1 monitors arrival of the standby time tc at a reference standby time TC (step B11) and the operation of the scanner key 18 (step B12). The reference standby time TC is a time for judging whether switching to the scanner function is continuously performed. When the switching to the scanner function is performed within the reference standby time TC, the control unit 1 judges that the switching to the scanner function is repeatedly performed. The reference standby time TC may be set in advance or arbitrarily.

When the standby time tc arrives at the reference standby time TC in step B11 (yes of step B11) while the scanner key 18 is not operated in step B12 (no of step B12), the control unit 1 judges that the switching to the scanner function is not repeatedly performed. The control unit 1 resets the scanner use time ta, the operation interval time tb, and the standby time tc (step B13) and thereafter, returns to step B1. Meanwhile, when the operation of the scanner key 18 is performed in step B12 (yes of step B12), the control unit 1 judges that the switching to the scanner function is repeatedly performed and judges that the scanner function is in use for a long time in step B8.

In the image forming apparatus 100 according to the embodiment, the slot unit 4 connected with the external memory is provided. As a result, a use type is assumed in which the read image data is stored in the external memory connected to the slot unit 4 when the manuscript image is read by the scanner function. Therefore, a time during which the external memory is connected to the slot unit 4 may be used as a reference to judge whether the scanner function is in use for a long time. In addition, when the time during which the external memory is connected to the slot unit 4 is equal to or more than a predetermined time, it may be judged that the scanner function is in use for a long time.

As described above, the embodiment is the image forming apparatus 100 including the in-body discharge tray 190 as a first discharge tray, the side discharge tray 200 as a second discharge tray, and the control unit 1 as well as having the printing function and the scanner function. In the printing function, the printed material acquired by recording the image data included in the printing job received through the network 20 on the recording paper P is discharged. In the scanner function, the image data is acquired by reading the manuscript MS. The in-body discharge tray 190 is provided in the discharge space in the body of the apparatus. The side discharge tray 200 is a discharge tray other than the in-body discharge tray 190. The control unit 1 judges whether the scanner function is in use for a long time. When the control unit 1 judges that the scanner function is not in use for a long time at the time of receiving the printing job, the control unit 1 discharges the printed material to the in-body discharge tray 190. When the control unit 1 judges that the scanner function is in use for a long time, the control unit 1 discharges the printed material to the side discharge tray 200. The control unit 1 judges that the scanner function is in use for a long time when the scanner operation is continuously performed for the reference use time while the scanner function is commanded. The control unit 1 judges that the scanner function is in use for a long time when the switching to the scanner function is repeatedly performed within the reference time. The control unit 1 judges that the scanner function is in use for a long time, when the time during which the external memory is connected to the slot unit provided to connect the external memory is equal or more than a predetermined time. By the aforementioned configuration, the control unit 1 judges a possibility that the in-body discharge tray will be blocked while the scanner function is in use, and when the possibility that the in-body discharge tray will be blocked while the scanner function is in use is high, the control unit 1 may discharge the recording paper to the discharge tray other than the in-body discharge tray.

Further, it is apparent that the present disclosure is not limited to the embodiment and may be appropriately changed within the scope of the spirit of the present disclosure. In addition, the number, positions, shapes, and the like of the respective constituent members are not limited to the embodiment and the number, positions, shapes, and the like which are suitable in carrying out the present disclosure may be selected. Moreover, in each figure, like reference numerals refer to like elements.

The invention claimed is:

1. An image forming apparatus having a printing function to discharge a printed material acquired by recording image data included in a printing job received through a network on a recording paper and a scanner function to acquire the image data by reading a manuscript image, comprising:
   a first discharge tray provided in a discharge space in a body of the apparatus;
   a second discharge tray other than the first discharge tray;
   a long-time use judging unit judging whether the scanner function is in use for a long time;
   a discharge destination selecting unit; and
   a slot unit connected with an external memory;
   wherein the discharge destination selecting unit discharges the printed material to the first discharge tray when the long-time use judging unit judges that the scanner function is not in use for a long time at the time of receiving the printing job, and
   discharges the printed material to the second discharge tray when the long-time use judging unit judges that the scanner function is in use for a long time at the time of receiving the printing job, and
   wherein the long-time use judging unit judges that the scanner function is in use for a long time when the external memory is connected to the slot unit over a predetermined time.

2. The image forming apparatus according to claim 1, wherein:
   the long-time use judging unit judges that the scanner function is in use for a long time when a scanner operation is continuously performed for a reference use time while the scanner function is commanded.

3. The image forming apparatus according to claim 1, wherein:
   the long-time use judging unit judges that the scanner function is in use for a long time when switching to the scanner function is repeatedly performed within a reference standby time.

* * * * *